United States Patent Office 3,829,460
Patented Aug. 13, 1974

3,829,460
PREPARATION OF TRIFLUOROMETHYL AROMATIC ISOCYANATES
Gerhard Buttner, Cologne, and Erich Klauke, Odenthal-Hahnenberg, Germany, assignors to Bayer Aktiengesellschaft, Leverkusen, Germany
No Drawing. Filed June 21, 1972, Ser. No. 265,021
Claims priority, application Germany, July 6, 1971, P 21 33 467.8
Int. Cl. C07c 119/04
U.S. Cl. 260—453 P     4 Claims

ABSTRACT OF THE DISCLOSURE

Side-chain-fluorinated aromatic isocyanates are obtained in high yield by heating the corresponding trichloromethyl phenyl isocyanates with antimony trifluoride in the absence of solvents. Compounds made by this process include 3,3' - bis-(trifluoromethyl)-4,4'-diisocyanato-diphenyl difluoromethane, 2,4 - bis-(trifluoromethyl)-phenyl isocyanate, 2,5-bis-(trifluoromethyl)-phenyl isocyanate, and 2,4-bis-(trifluoromethyl)-phenyl-1,5-diisocyanate.

BACKGROUND

This invention relates to a process for the production of side-chain-fluorinated aromatic isocyanates and to the resulting compounds.

Although it is known that aromatic isocyanates having perchlorinated side chains can be converted through chlorine-fluorine exchange in hydrogen fluoride into the corresponding fluorinated compounds (DAS No. 1,138,391), our own later research showed that, if the trichloromethyl group is in the 2-position to the isocyanate group, it is only possible to obtain the isomers, 2-N-trifluoromethyl-amino-benzoyl fluorides, when working in hydrogen fluoride [Angewandte Chemie 78, 829 (1966)].

It is also known that aromatic isocyanates having a trifluromethyl group in the 2-position can be obtained by phosgenating the correspondingly substituted aromatic amines [Z.obsc. Chem. 39, 2515 (1969) and Zh. Org. Khim 6, 2293 (1970)]. Unfortunately, the 2 - trifluoromethyl-substituted aromatic amines required as starting materials, or the intermediates involved in their preparation, are extremely difficult to obtain and can only be produced by laborious methods so that this process has never acquired any practical significance.

SUMMARY

It has now surprisingly been found that side-chain-fluorinated aromatic isocyanates, optionally substituted in the nucleus, can readily be obtained in extremely high yields by heating the corresponding trichloromethyl phenyl isocyanates with antimony trifluoride in the absence of solvents.

DESCRIPTION

The reaction is carried out at a temperature from 90 to 150° C., preferably at a temperature of from 110 to 130° C. The molar ratio of antimony trifluoride is such that in general from 1 to 1.2 and preferably from 1 to 1.05 equivalents are available per trichloromethyl group.

Although it is known that side-chain-chlorinated aromatic compounds can be fluorinated with antimony trifluoride (cf. Houben-Weyl Methoden der organischen Chemie, Vol. V/III, page 176, 4th Edition), smooth highly productive fluorination in the presence of an isocyanate group has hitherto been unknown, and is all the more surprising inasmuch as the antimony trichloride formed during fluorination is known to be an effective Friedel-Crafts catalyst for the isocyanate group, and should have resulted in the formation of condensation products at the reaction and distillation temperatures (cf. G. A. Olah, "Friedel-Crafts and related Reactions" Vol. I, page 121 and page 269, Interscience Publishers, New York, London 1964). It is extremely surprising that this secondary reaction does not take place in the process according to the invention. This secondary reaction does occur, however when the aromatic isocyanate does not contain a trichloromethyl group. If, for example, phenyl isocyanate or chlorophenyl isocyanate is treated with a mixture of SbF$_3$/SbCl$_3$, polycondensation products are formed in a smooth reaction under the reaction conditions employed in the process according to the invention.

Another advantage of the process according to the invention is that the starting material does not undergo any rearrangement during the reaction. The antimony trichloride formed from the antimony trifluoride can be recovered in high yields and in highly pure form by straightforward distillation. As described in the literature, antimony trichloride can readily be reconverted into antimony trifluoride by reaction with hydrogen fluoride, thus making the new process particularly advantageous.

The process according to the invention is illustrated with reference to the following example:

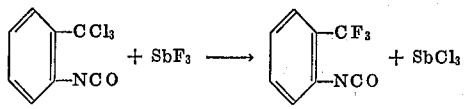

The majority of starting compounds used for the process according to the invention are known, or can be obtained by known methods, and correspond to the general formula:

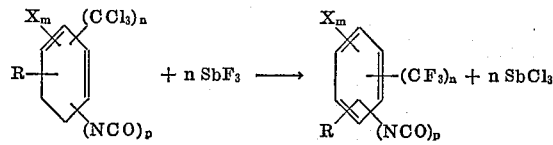

in which $m$ represents 0, 1 or 2, $n$ and $p$ can be the same or different, and each represent 1 or 2, X represents halogen, and R represents hydrogen or a phenyl radical, optionally substituted by halogen, NCO— or CCl$_3$— or a dichloromethyl phenyl radical; the NCO— or CCl$_3$— groups in these radicals being present in the same numbers as quoted for $n$ and $p$.

Fluorine, chlorine and bromine are preferred halogen atoms.

The following are examples of starting compounds suitable for use in the process according to the invention:

2-trichloromethyl-5-chlorophenyl isocyanate;
2-trichloromethyl-4-fluorophenyl isocyanate;
3,5-bis-(trichloromethyl)-phenyl isocyanate;
2-trichloromethyl-phenyl-1,5-diisocyanate;
2-trichloromethyl-4-chloro-phenyl-1,5-diisocyanate;
2-trichloromethyl-4-bromophenyl isocyanate;
2-trichloromethyl-4,6-dichlorophenyl isocyanate;
2,3-bis-(trichloromethyl)-phenyl isocyanate;
2-trichloromethyl-6-chlorophenyl isocyanate;
2-chloro-3-trichloromethyl-phenyl isocyanate; or
3-trichloromethyl-5-bromophenyl isocyanate.

The following are particularly preferred starting compounds:

2-trichloromethyl phenyl isocyanate;
2,4-bis-(trichloromethyl)-phenyl isocyanate;
2,5-bis-(trichloromethyl)-phenyl isocyanate;

2-trichloromethyl-4-chlorophenyl isocyanate;
2,4-bis-(trichloromethyl)-phenyl-1,5-diisocyanate;
3,3'-bis-(trichloromethyl)-4,4'-diisocyanato-diphenyl; or
3,3'-bis-(trichloromethyl-4,4'-diisocyanato-diphenyl dichloromethane.

It is, of course, also possible to use as starting compounds, aromatic isocyanates in which the trichloromethyl group is not in the 2-position to the isocyanate group, for example 4-trichloromethyl phenyl isocyanate, 4-trichloromethyl-6-chlorophenyl isocyanate or 3-trichloromethyl-6-chlorophenyl isocyanate.

The compounds obtainable by the process according to the invention can readily be separated from the simultaneously-formed antimony trichloride by distillation. The compounds obtainable by the process, including the new compounds are valuable intermediates for the production of dyestuffs and plant protection agents. Hydrolysis of the isocyanate group by known methods, makes it possible to obtain side-chain-fluorinated aromatic amines, which otherwise can only be obtained by complicated methods.

The following compounds are new:
2,4-bis-(trifluoromethyl)-phenyl isocyanate,
2,5-bis-(trifluoromethyl)-phenyl isocyanate,
2,4-bis-(trifluoromethyl)-phenyl-1,5-diisocyanate, and
3,3'-bis-(trifluoromethyl)-4,4'-diisocyanato diphenyl difluoromethane.

The new compounds obtainable by the process of this invention can be transferred in the same manner as known compounds into the corresponding amines which can be used as dyestuff intermediates (U.S. Pat. No. 1,929,328; DRP 590,255; Swiss Pats. No. 305,018; No. 305,012; No. 303,158).

The new isocyanates can easily be transformed into the corresponding amines according to the process described in British Pat. 1,164,223 which corresponds to Deutsche Offenlegungsschrift 1,543,624. In the following the preparation of 2,5-bis-(trifluoromethyl)-anilin is described:

26 g. (0.1 mol) of 2,5-bis(trifluoromethyl)-phenyl isocyanate are slowly dropped into 50 g. (0.5 mol) of concentrated $H_2SO_4$ at a temperature of 40 to 60° C. The reaction mixture is stirred until the evolution of gas ceases. Afterwards the reaction mixture is cooled and pourred on 150 g. of ice. Afterwards 150 g. of aqueous NaOH (30%) are added and the organic phase is separated. By distillation the 2,5-bis-(trifluoromethyl)-anilin is obtained as a colorless liquid boiling at 83 to 85° C./12 torr. In the same manner, also the other new isocyanates can be transformed to the corresponding amines. The new amines obtainable by our process can be used for the preparation of dyestuffs. Thereby exactly the same process can be applied as described for dyestuffs starting from 3,5-bis-(trifluoromethyl)-anilin in accordance with U.S. Pat. No. 1,929,328. The method for preparing such dyestuffs is furthermore obvious from "Chemie der Farbstoffe und deren Anwendung Steinkopf-Verlag, Dresden/Leipzig 1963, Seite 266" and furthermore from "Künstliche organische Farbstoffe und ihre Anwendungen, Enke-Verlag, Stuttgart 1957, Seite 220."

The new isocyanates obtainable by our process can furthermore be used for preparing compounds showing herbicidal activity as described in Deutsche Offtenlegungsschrift 2,005,118 and additionally in Deutsche Patentanmeldung P 21 32 763.9 (=U.S. Ser. No. 338,708 filed Mar. 7, 1973).

In the following examples the temperatures are given in ° C.

EXAMPLE 1

720 g. of finely powdered anhydrous antimony trifluoride and 25% 237 g. (25% of the total quantity) of 2-trichloromethyl phenyl isocyanate are introduced into a 2-litre three-necked flask equipped with a dropping funnel, stirring mechanism and distillation bridge. The apparatus is evacuated to 100 Torr and its contents are heated with stirring to 130° C. Reaction begins at approximately 80° C. After the slightly exothermic reaction has abated, the reaction mixture is heated to 140° C. and the remaining 75% (711 g.) of isocyanate are run in over a period of approximately 30 minutes. After cooling 2-trifluoromethyl phenyl isocyanate, having the formula

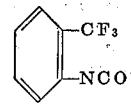

is obtained in the form of a colourless liquid of b.p. 65–79° C./11 Torr.

The antimony trichloride formed distills over as second fraction at b.p.=100–110° C./11 Torr in the form of a deep yellow liquid which quickly crystallises; yield 805 g. (88.5%), m.p. 63–69° C.

EXAMPLE 2

33.5 g. of 2-trichloromethyl-4-chlorophenyl isocyanate and 23 g. of antimony trifluoride are heated with stirring to 130° C. A weakly exothermic reaction begins at 90° C., and the mixture turns yellow in colour. A dark-coloured clear solution is formed after 20 to 30 minutes. It is left to cool and distilled through a 20 cm. column. 25 g. (90% of 2-trifluoromethyl-4-chlorophenyl) isocyanate having the formula

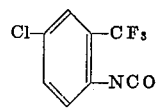

are obtained in the form of a crystal-clear liquid of b.p. 85–90° C./13 Torr.

The antimony trichloride formed distills over at b.p. 95–105° C./13 Torr (yield 26 g. (91%), m.p. 63–69° C.).

EXAMPLE 3

236 g. of 3,3-bis-(trichloromethyl)-diphenyl-4,4'-diisocyanate, obtained in quantitative yield by chlorinating 3,3'-dimentyl benzidine, are initially heated to 100° C., followed by the addition of 180 g. of finely powdered antimony trifluoride. The mixture is then heated with stirring at 130 to 140° C. until a clear dark-coloured solution is formed. A weakly exothermic reaction begins at 120° C. After cooling, the product is distilled in vacuo. 220 g. (100%) of antimony trichloride (m.p. 65–70° C.) distil over as the first fraction at b.p. 72–105° C./0.4 Torr. 138 g. (74%) of 3,3'-bis-(trifluoromethyl)-diphenyl-4,4'-diisocyanate having the formula

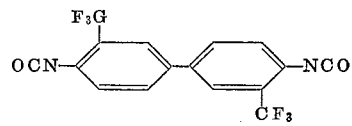

are obtained, b.p. 150–170° C./0.4 Torr, m.p. 109–112° C.

EXAMPLE 4

554 g. of 3,3'-bis-(trichloromethyl)-4,4'-diisocyanato-diphenyl dichloromethane, obtained in quantitative yield by chlorinating 3,3'-dimethyl-4,4'-diisocyanato-diphenyl methane, are initially heated to 120° C., 480 g. of finely powdered antimony trifluoride are added and the mixture is heated with stirring to 130° C. A weakly exothermic reaction begins at 120° C. After 20 to 30 minutes, a clear dark coloured solution is formed. It is left to cool and fractionated in vacuo.

The antimony trichloride formed is obtained in a quantitative yield at b.p. 80–110° C./0.06 Torr.

347 g. (83%) of 3,3'-bis-(trifluoromethyl)-4,4'-diisocyanato-diphenyl diffuoromethane are obtained as the second fraction:

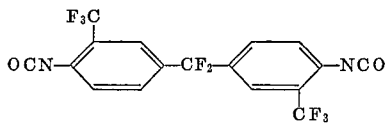

b.p. 150–165° C./0.06 Torr; m.p. 77–80° C.

The following compounds can also be prepared in the same way as in the preceding Examples:

2,4-bis-(trifluoromethyl)-phenyl isocyanate (b.p. 67–70° C./12 Torr)

2,5-bis-(trifluoromethyl)-phenyl isocyanate (b.p. 71–84° C./15 Torr)

2,4-bis(trifluoromethyl)-phenyl-1,5-diisocyanate (b.p. 96° C./0.4 Torr)

What is claimed is:

1. Process for producing a side-chain-fluorinated aromatic isocyanate which comprises reacting a trichloromethyl phenyl isocyanate having the formula

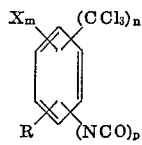

wherein
$m$ represents 0, 1 or 2,
$n$ and $p$, which can be the same or different, each represents 1 or 2,
X represents halogen, and
R represents hydrogen, phenyl, halogenophenyl, phenyl substituted by $p$ NCO-groups and $n$ trichloromethyl groups, or dichloromethyl phenyl, with from 1 to 1.2 equivalents of antimony trifluoride per trichloromethyl group at a temperature of from 90° to 150° C. in the absence of a solvent.

2. Process of claim 1 wherein the temperature is from 110 to 130° C.

3. Process of claim 1 wherein from 1 to 1.05 equivalents of antimony trifluoride are employed per trichloromethyl group.

4. Process of claim 1 wherein the trichloromethyl phenyl isocyanate is selected from the group of
2-trichloromethyl-5-chlorophenyl isocyanate;
2-trichloromethyl-4-fluorophenyl isocyanate;
3,5-bis-(trichloromethyl)-phenyl isocyanate;
2-trichloromethyl-phenyl-1,5-diisocyanate;
2-trichloromethyl-4-chloro-phenyl-1,5-diisocyanate;
2-trichloromethyl-4-bromophenyl isocyanate;
2-trichloromethyl-4,6-dichlorophenyl isocyanate;
2,3-bis-(trichloromethyl)-phenyl isocyanate;
2-trichloromethyl-6-chlorophenyl isocyanate;
2-chloro-3-trichloromethyl-phenyl isocyanate;
3-trichloromethyl-5-bromophenyl isocyanate;
2-trichloromethyl phenyl isocyanate;
2,4-bis-(trichloromethyl)-phenyl isocyanate;
2,5-bis-(trichloromethyl)-phenyl isocyanate;
2-trichloromethyl-4-chlorophenyl isocyanate;
2,4-bis-(trichloromethyl)-phenyl-1,5-diisocyanate;
3,3'-bis-(trichloromethyl)-4,4'-diisocyanato-diphenyl;
3,9'-bis-(trichloromethyl)-4,4'-diisocyanato-diphenyl di chloromethane;
4-trichloromethyl-phenyl isocyanate;
4-trichloromethyl-6-chlorophenyl isocyanate; and
3-trichloromethyl-6-chlorophenyl isocyanate.

References Cited

Hudlicky: Chemistry of Organic Fluorine Compounds, MacMillan Co., N.Y., pp. 93–96 (1962).

Malichenko et al: Chemical Abstracts, vol. 74, p. 330 (1971).

Inukai et al: Chemical Abstracts, vol. 69, p. 8991 (1968).

LEWIS GOTTS, Primary Examiner

D. H. TORRENCE, Assistant Examiner

U.S. Cl. X.R.

260—453 AR, 570 D, 578